United States Patent [19]
Chu

[11] Patent Number: 5,088,223
[45] Date of Patent: Feb. 18, 1992

[54] FISHING ACCESSORY

[76] Inventor: Tak Y. W. Chu, Lot 232 D.D. 233 Off Clear Water Bay Road, House 10, Ha Yueng New Village, Sai Kung, Kowloon, Hong Kong

[21] Appl. No.: 610,521

[22] Filed: Nov. 8, 1990

Related U.S. Application Data

[63] Continuation-in-part of Ser. No. 393,883, Aug. 14, 1989, abandoned.

[51] Int. Cl.⁵ .............................................. A01K 97/12
[52] U.S. Cl. ............................................ 43/17; 43/25
[58] Field of Search ...................................... 43/17, 25

[56] References Cited

U.S. PATENT DOCUMENTS

| | | | |
|---|---|---|---|
| 3,053,003 | 9/1962 | Barnes et al. | 43/17 |
| 3,091,881 | 6/1963 | Evans | 43/17 |
| 3,216,142 | 11/1965 | Kricksfeld et al. | 43/17 |
| 4,418,489 | 12/1983 | Mathauser | 43/17 |
| 4,422,258 | 12/1983 | Adams et al. | 43/17 |
| 4,445,786 | 5/1984 | Jackson | 368/10 |
| 4,471,555 | 9/1984 | Soukup | 43/17 |
| 4,586,284 | 5/1986 | Westwood, III | 43/17 |
| 4,693,125 | 9/1987 | Krutz et al. | 73/862.39 |
| 4,731,946 | 3/1988 | Blythe et al. | 43/17 |

Primary Examiner—Kurt Rowan
Attorney, Agent, or Firm—Reese Taylor

[57] ABSTRACT

A sensing device for use with a fishing rod comprises a body, support means connected to the body and adapted to secure the sensing device to a fishing rod, sensing means extending from the body which, in use, contact the fishing line of a fishing rod, the sensing means being mounted in such a way that any force exerted on the line is transferred to the sensing member and thus to the body, and electronic means posiitoned within the body and adapted to receive the force exerted on the sensing means, and transform that force into a visual and/or audio indication to show that a pull is being exerted on the fishing line.

21 Claims, 8 Drawing Sheets

FISHING ACCESSORY

RELATED PATENT APPLICATIONS

This application is a continuation-in-part of Applicant's earlier filed application Ser. No. 393,883 filed Aug. 14, 1989 now abandoned.

BACKGROUND OF THE INVENTION

This invention relates to a fishing accessory for monitoring any pull exerted on a fishing line.

Whilst fishing, it is often difficult to assess whether a pull is being exerted on a fishing line, and thus it is often difficult to know when to exert a strike on a fishing rod in an attempt to catch a fish.

SUMMARY OF THE INVENTION

In accordance with the invention, a sensing device for use with a fishing rod comprises a body, support means connected to the body and adapted to secure the sensing device to a fishing rod, sensing means extending from the body which in use contact the fishing line of a fishing rod, the sensing means being mounted in such a way that any force exerted on the line is transferred to the sensing member and thus to the body, and electronic means positioned within the body and adapted to receive the force exerted on the sensing means, and transform that force into a visual and/or audio indication to show that a pull is being exerted on the fishing line.

Such an arrangement is advantageous in that it will give to a fisherman an indication that a pull is being exerted on the fishing line, and that the fisherman should make a strike in an effort to catch a fish.

Preferably, the sensing means is collapsible after disengagement with the electronic means to a position adjacent the body so that when the fishing rod is being used for casting, the sensing means does not obstruct release of fishing line from the fishing reel. The sensing means is pivotally mounted to the body so that, after casting, the sensing means can be easily pivoted back into position such that any pull on the line is monitored.

Suitably, the sensing device is also adapted to be used as a weighing apparatus when not in use, sensing any pull on the fishing line, and in particular an article to be weighed is placed on weighing means and will exert a force thereon which will be transferred to the electronic means within the body, which thereafter will give a visual indication of the weight of the article on the weighing means.

Suitably, the sensing means and weighing means are integrally connected to each other, such that only a single electronic means is required to indicate pull on the line or the weight of an article on the weighing means.

Preferably, the pull on the line or weight on the weighing means exerts a force which pivotally displaces the sensing means/weighing means-the greater the angular displacement thereof, the greater the pull/weight. The electronic means measures the amount of angular displacement to ascertain the extent of pull/weight being exerted.

Advantageously, the body of the sensing device is provided with a control keyboard and a display panel, such that the apparatus can be controlled and information indicated on the display.

BRIEF DESCRIPTION OF THE PREFERRED EMBODIMENTS

Figure 1:
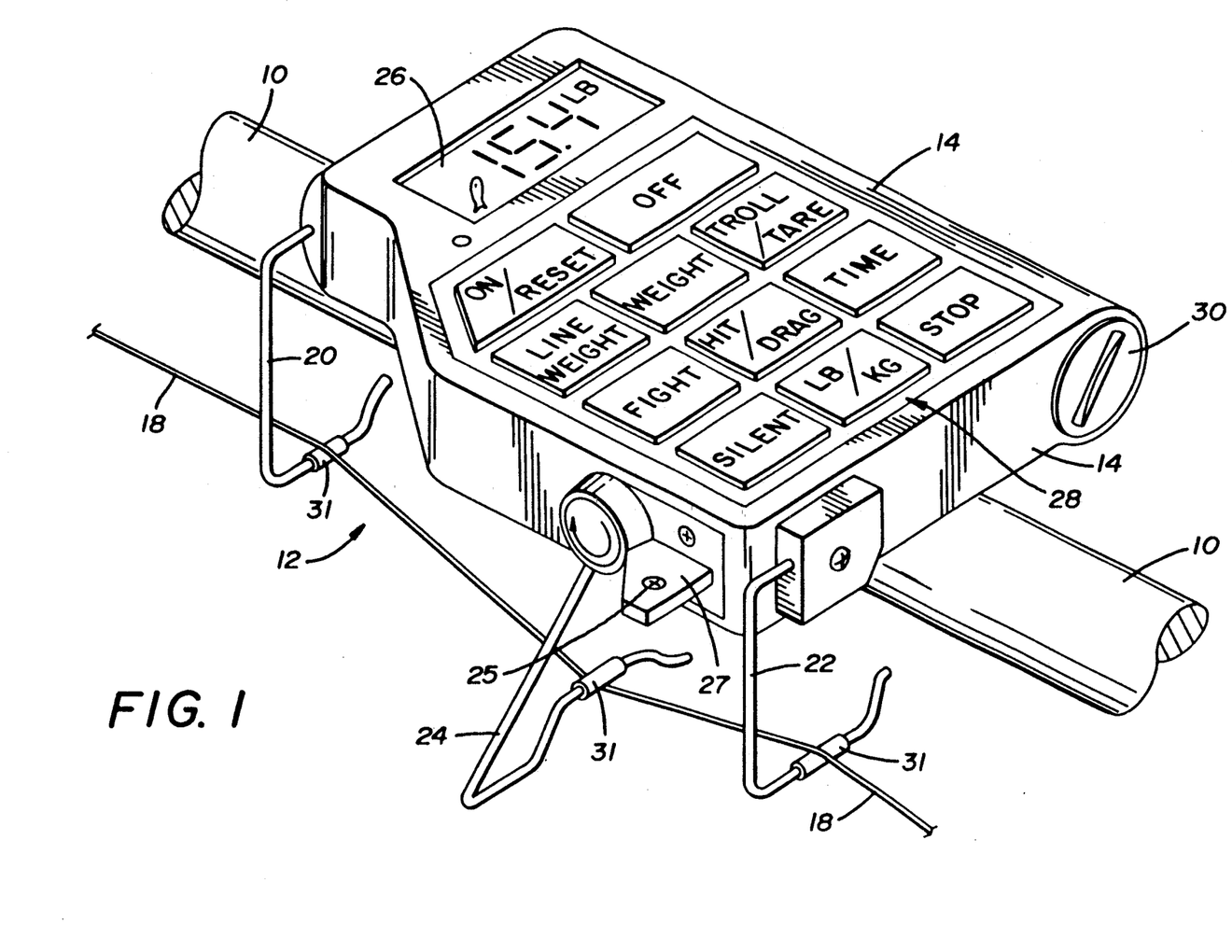
FIG. 1 is a perspective view showing the sensing device of the present invention.

In FIG. 1, a fishing rod 10 is shown having a sensing device 12 securely mounted thereon (by screw clamp means not shown).

The sensing device 12 comprises a body 14 and an arrangement to sense any pull exerted on a fishing line 18.

This arrangement comprises three hook arm members, one fixed arm 20 supported at the top of the device, another fixed arm 22 supported at the rear of the device, and a third and final movable sensor arm 24 positioned intermediate the two fixed arms.

The arrangement is such that the fishing line passes between the upper surfaces of free wheeling rollers 31 mounted on the two fixed arms and is distorted downwardly around the underneath surface of a free wheeling roller 31 mounted on the sensor arm 24, the rollers 31 preventing any resistance to the fishing line 18 whilst being let out or reeled in. The arrangement is also such that any pull exerted on the line 18 will be exerted against the sensor arm and will provide a force on the sensor arm, which force will be transferred to the body member 14 where the force will be measured by electronic means within the body 14, which transform that force into an indication of the force exerted on the line.

The indication that a force is being exerted on the line can be either an audio indication (e.g., a piezo buzzer), or a visual indication (e.g., flashing LED).

The sensor arm 24 is pivotally mounted (after disengagement with the electronic means—e.g., being pulled out) such that it can be easily collapsible during casting of the line to a position adjacent the body, whereby the fishing line is not obstructed during casting. After the line has been cast, the sensor arm can be easily moved back into position and in contact with the fishing line, such that any pull thereon will be detected.

The arrangement also acts as an electronic weighing apparatus, and in this respect, a weight (such as a fish) can be mounted in a hole 25 provided on weighing means in the form of a pivotally mounted plate 27, whereby the force exerted by the weight on the plate is transferred to the body 14 whereafter the electronic means within the body provides an indication of the weight on a display panel 26. The sensor arm 24 and plate 27 are integrally connected to each other whereby they are pivotally mounted together, such that only a single electronic means is required to indicate pull on the line or the weight of an article on the plate 27. In particular, the pull on the line or weight on the plate 27 pivotally displace the integral arm 24 and plate 27—the greater the angular displacement thereof (see 29), the greater the pull/weight. The electronic means measures this amount of angular displacement to ascertain the extent of pull/weight being exerted. It will be noted that the sensor arm 24 can give an approximate indication of the weight of a fish on the line; however, for more accurate measurement, the fish is removed from the line and placed on the plate 27.

The body is provided with a membrane keyboard switch panel 28 for a number of functions, such as an on/off key, a reset key, a mute key, a key to give an indication of amount of pull being exerted on the line, a key to give an indication of total force exerted on the line since initial pull, a key to indicate the amount of weight being placed on the plate, a time indicator key in order to give the time since a pull was first exerted on the line (such that the time that the fish is taken to land is known), a maximum pull indicator key (such that the maximum force exerted on the line during a landing of a fish is known which is useful for adjusting the drag setting of the reel), a pound/kilogram select key, and a weight control key. This latter switch is used to measure the weight of a combined weight, which will be stored, and then the weight of an individual component, whereafter the resultant weight of the other component can be calculated by the electronic means and displayed. This is of use when, for instance, a fish is placed in a container and weighed on the plate 27 whereby the combined weight of the fish and container can be weighed, and whereafter the weight of the container by itself is weighed on the plate 27 in order to give a resultant weight for the fish. The weight control switch can also be used for calibration, in other words to compensate for a constant force being exerted on the fishing line (e.g., weight of objects on the line such as lead weights, or the "trolling" force being exerted by water movement on the bait/hook/line).

A power source (preferably a battery) is provided within the body member (see battery compartment closure 30) in order to power the main CPU board, which houses most of the electronics, and the 4-digit LCD display 26.

The body 14 is securely mounted to the rod 10 in order to be secured thereto even during casting of the line; however, the securing means is also arranged to give quick release, such that the body 14 can be removed quickly from the rod if necessary.

Figure 2:
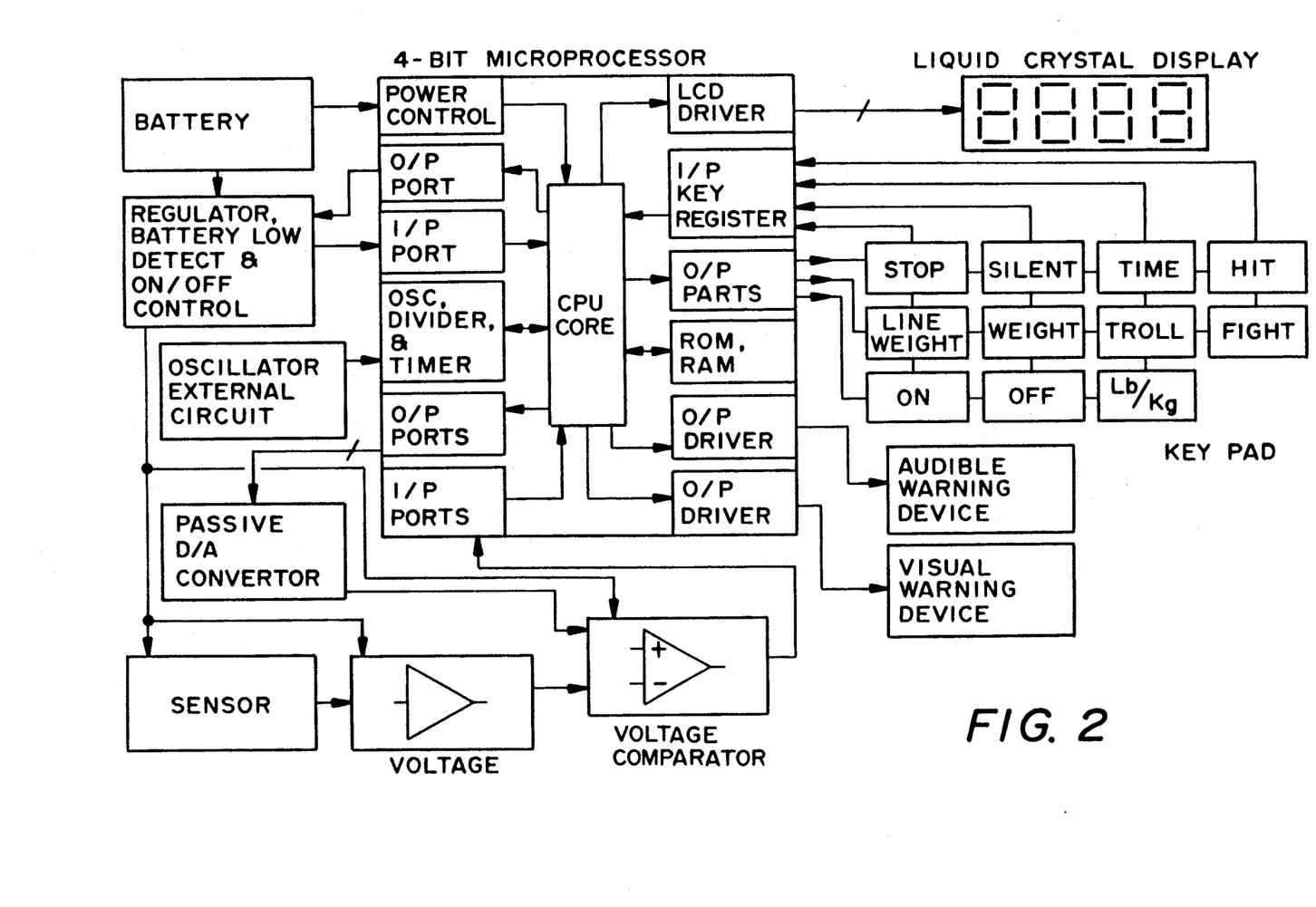
FIG. 2 is a block diagram illustrating the composition of the electronic sensing means.
Figure 3:
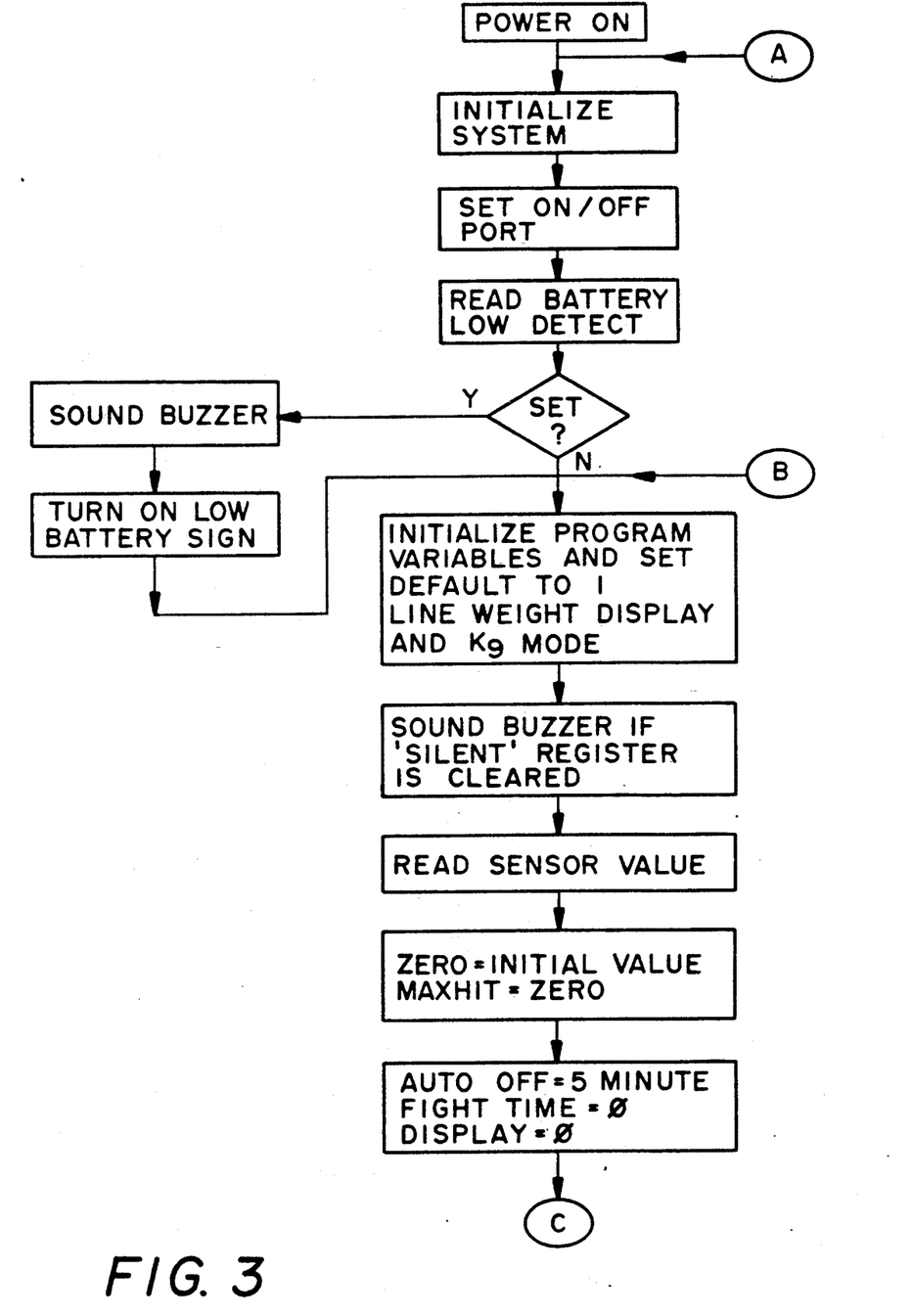
FIGS. 3 through 8 constitute a flow chart illustrating the operation of the fishing accessory.
Figure 4:
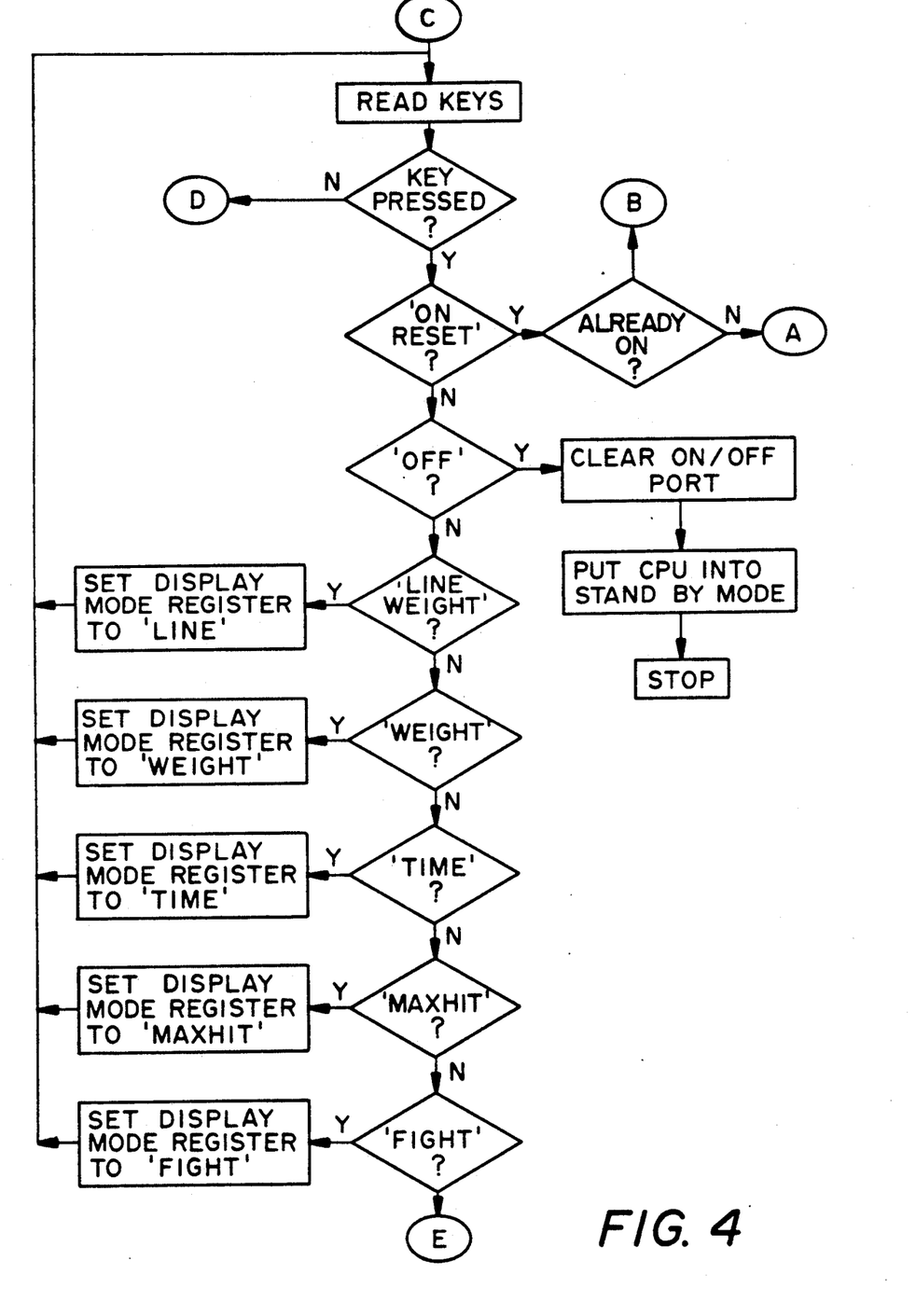
Figure 5:
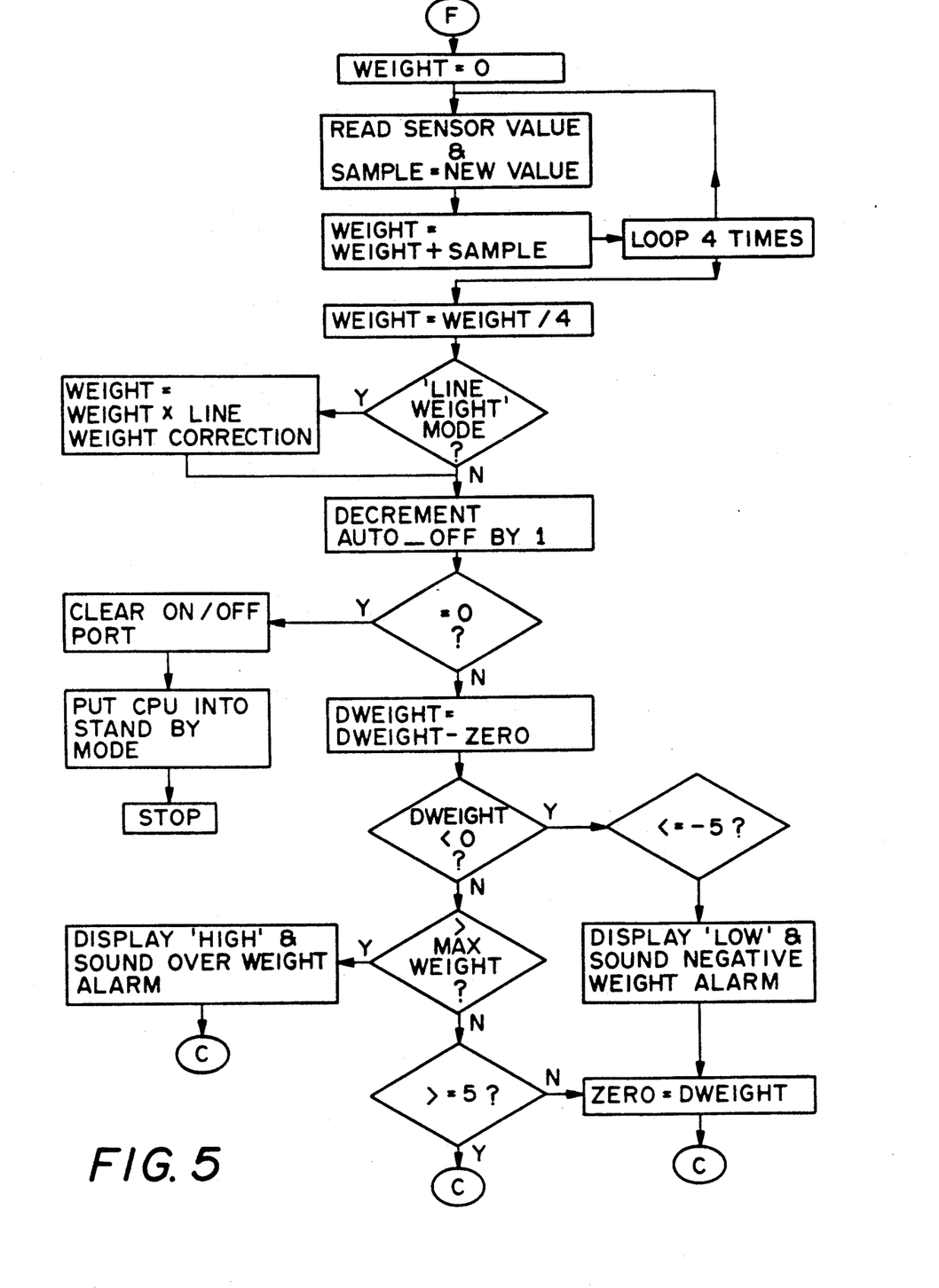
Figure 6:
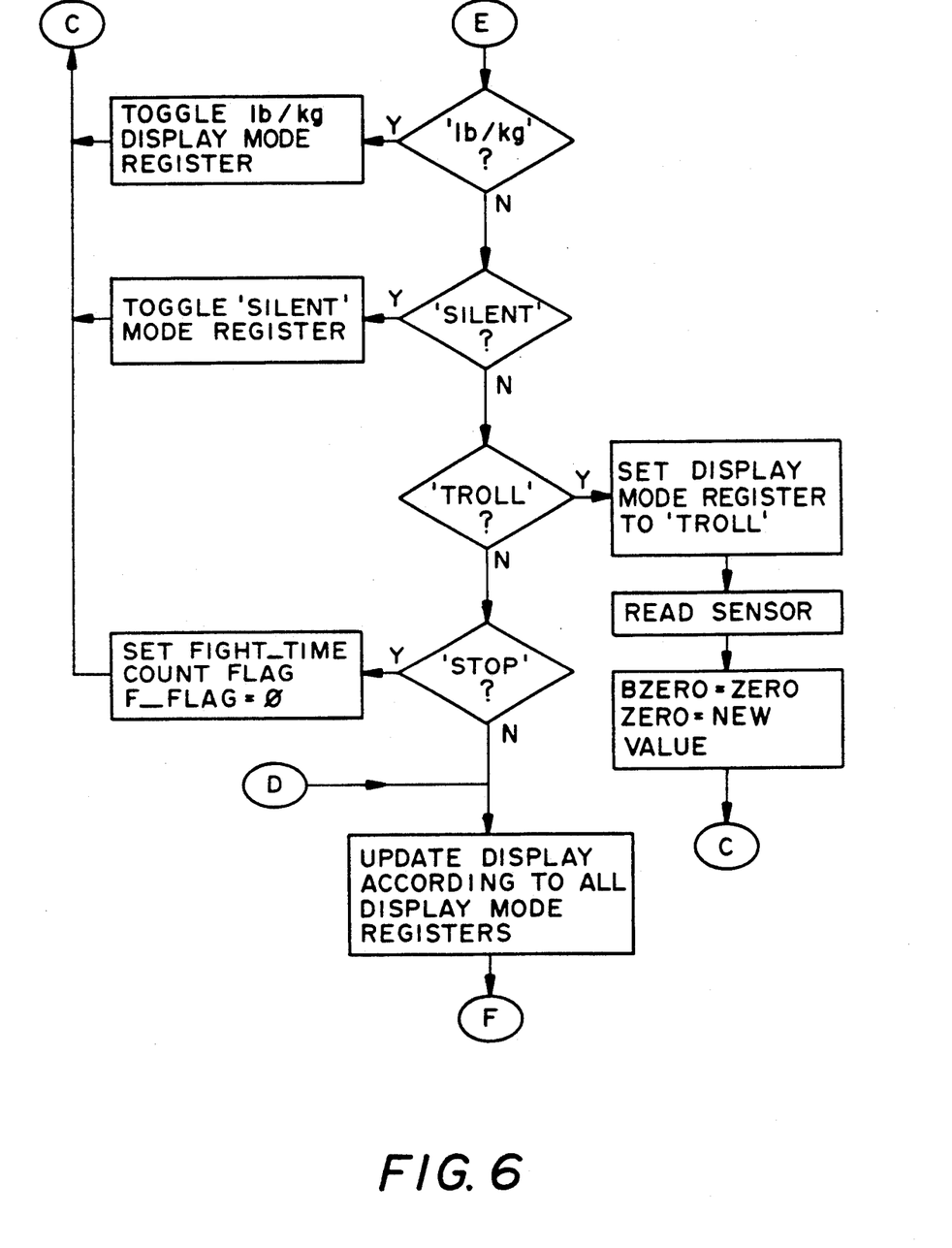
Figure 7:
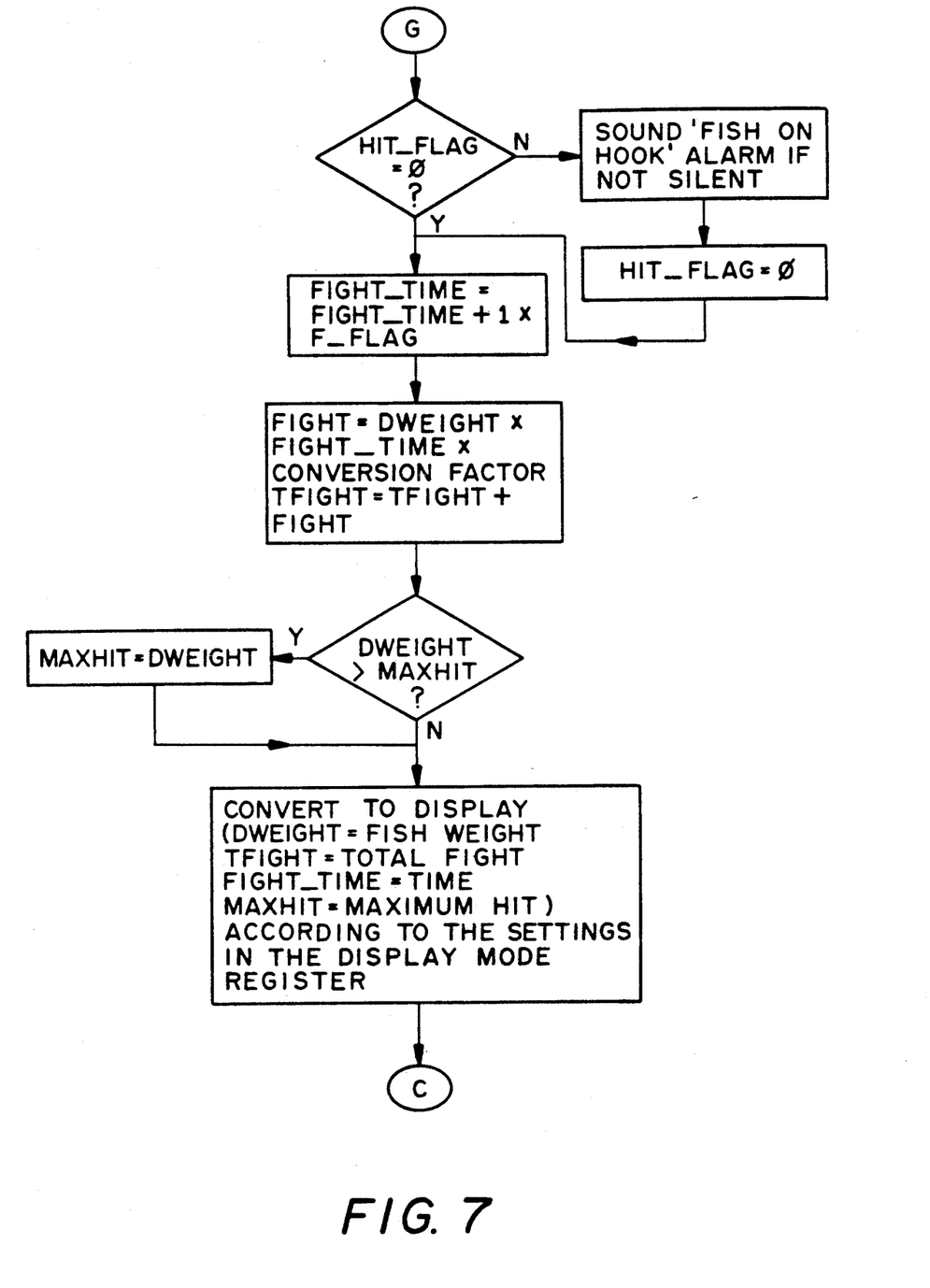
Figure 8:
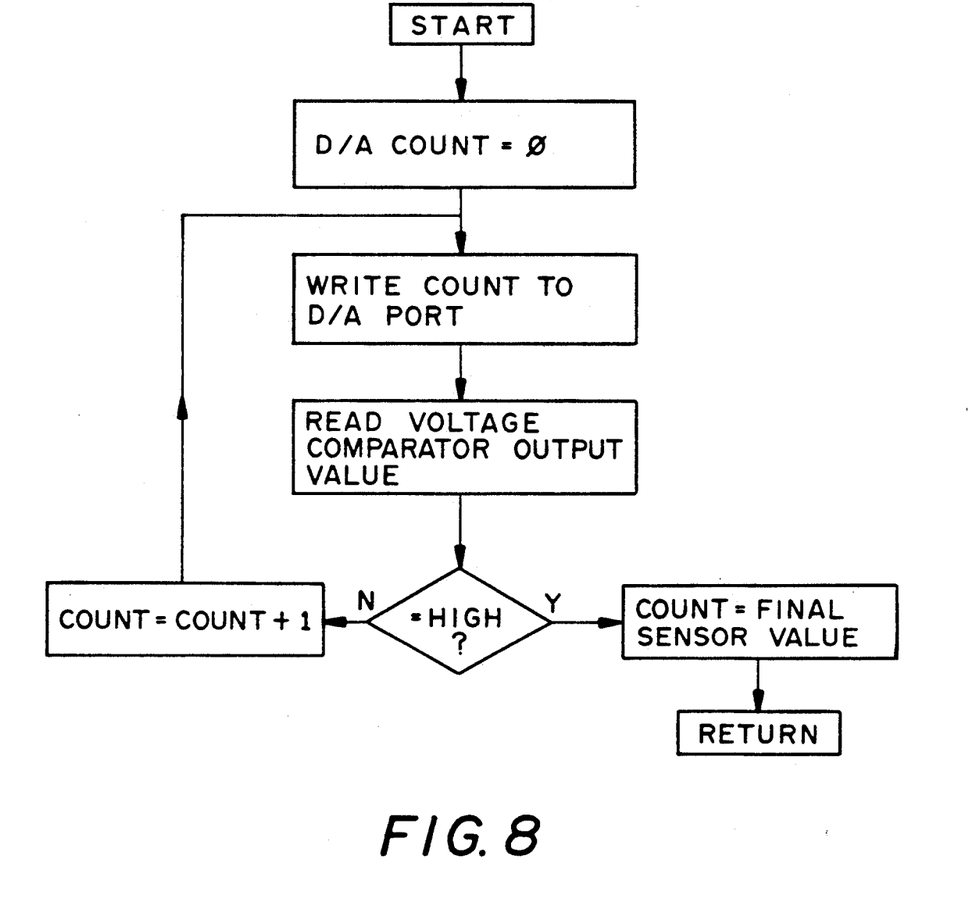

Referring next then to FIG. 2 for an explanation of the electronic components, the block diagram discloses basically a 4-bit microprocessor which interconnects with a plurality of components including a liquid crystal display (LCD), a key pad, an audible warning device, a visual warning device, a voltage comparator, a voltage amplifier, a sensor, a passive D/A convertor, an oscillator external circuit, a regulator (battery low detect and on/off control), and a battery.

The liquid crystal display, key pad, audible warning device, visual warning device, oscillator external circuit, regulator and battery are all connected directly to the 4-bit microprocessor.

The battery regulator, sensor, voltage amplifier, voltage comparator and passive D/A convertor meanwhile are also connected together in a circuit and with the microprocessor as shown in the block diagram.

More specifically, the 4-bit microprocessor comprises a power control component connected to the battery, an output port and input port for the regulator, an oscillator (divider and timer), an output port and input port for the voltage amplifier/comparator circuit, an output driver for the audible warning device and an output driver for the visual warning device, ROM/RAM, output ports for the key pads, an input key registor for the key pad, LCD driver for the LCD, and a CPU core. Each of the components of the microprocessor are interconnected with the CPU core.

An exemplary 4-bit microprocessor that is suitable for use with the present invention is the SMC 6214 from Seiko Epson Corp. of 3-3-5, Owa, Suwa-Shi, Nagano-Ken, 392, Japan.

An exemplary sensor that is suitable for use with the present invention is the Foil Strain Gage part number 46 from Minebea Co. Ltd. of 1-1-1, Katase, Fujisawa-Shi, Kanagawa-Ken, 251, Japan. Another would be a custom made capacitive sensor consisting of two conductive plates separated by a suitable dielectric material such as a thin plastic sheet or just an air gap, whereby the force to be measured will deform one of the conductive plates, hence changing the capacitance value of this set up. This change of capacitance value can then be converted by electronic means, to a suitable form such as a voltage level or frequency that is readily measurable by the microprocessor.

The passive D/A convertor of the present invention may be composed of resistors of specific values, either in discrete or packaged form. Parts from any manufacturer may be suitable as long as the performance requirement can be met. A typical sensor and D/A circuit would include an 8-bit output port from the microprocessor where each bit can be individually switched to either a "1" (representing a high voltage reference) or a "0" (representing a 0 volt reference). The value R in ohms is so chosen to suit the circuit operation criteria. When the microprocessor outputs to the D/A convertor, a unique voltage level representing the binary state of the output port will be present at the "−" input to the voltage comparator. When this voltage exceeds the sample voltage amplitude obtained from the sensor, the output of the comparator is cleared. A 1-bit input port to the microprocessor can then be used to detect such change of the voltage comparator, and a binary representation of the sensor voltage can then be obtained for further processing as the software requires.

Referring to FIGS. 1 and 3 through 8, operation of various aspects of the present invention may be further understood.

Thus, to switch on the unit, the "ON/RESET" key is pressed. All segments on the liquid crystal display (LCD) will turn on for a second, the buzzer will give a short beep, then the unit is ready for normal operation.

To switch off the unit, the "OFF" key is pressed. The unit will automatically switch itself off if the unit is not being operated for more than 5 minutes.

With regard to inactivating the alarm, each pressing of the "SILENT" key will toggle the alarm status between on and off. The visual warning will always be operative even when the audible alarm is off. The buzzer and light alarm indicate conditions such as key pressed confirmation, fish bite, weight over limit, weight under limit, etc.

To measure the instantaneous pull exerted by a fish, with the unit mounted onto the rod, the line 18 must be latched on to the sensor arm 24 of the unit, so the pull on the line 18 can be detected. Pressing the "LINE WEIGHT" key changes the display mode to line weight and the display is updated every second to show the force on the line 18 in either lb. or kg. units. The "ON/RESET" key is pressed after casting. When a sudden change of more than 100 g is detected, the microprocessor interprets it as a "bite" condition and makes an alarm. Subsequent pull will not further turn on the alarm.

The weight of the catches is weighed on the shorter side of the sensor arm 24. Pressing the "ON/RESET"

key resets the display to O. When catches are hooked on the sensor arm, the weight is displayed in either lb. or kg. according to the unit mode. If the weight on the sensor arm 24 is over the designed limit a "high" will be displayed and the overweight alarm will sound.

The maximum force exerted by a fish during a catch is put into memory by the microprocessor and can be recalled into memory by the microprocessor and can be recalled to the display any time by pressing the "HIT" key. The display is either in lb. or kg. according to the unit mode.

To record and display the duration of a catch, it will be noted that an internal timer will be activated by a "bite" condition, and the timer will continue to run until the "STOP" key is pressed. A short timing beep is given every minute to indicate that the timer is running. The "STOP" key should be pressed immediately after the catch is landed to stop the timer and the "fight" calculation. The timer can be displayed on the LCD by pressing the "TIME" key.

In order to change the measurement unit, it is necessary to press the "Lb/Kg" key. Each press on the "Lb/Kg" key will toggle the measurement unit between lb. and kg.

Troll fishing can be performed by pressing the "TROLL" key after casting the line 18. The steady pull on the line will be ignored and regarded as the zero reference.

When catches can only be weighed in a container or in a similar situation, the true weight of the catch can be determined by first weighing the container without the catches. While the catches are still on the hook, press the "TROLL" key, whereby the display will be reset to zero. Then weigh the catches in the container. The display value will be the weight of the catches alone.

The embodiment shown in the drawing is to be used specifically with a fishing rod having the spool mounted on the underneath of the rod; however, with slight modification, an alternative embodiment of the sensing device could be used with a fishing rod, where the spool is positioned on the top of a fishing rod.

What is claimed is:

1. A sensing device for use with a fishing rod and line comprising a body; support means connected to said body and adapted to secure the sensing device to the fishing rod; sensing means extendable from said body into contact with the fishing line of the fishing rod; said sensing means being mounted in such a way that any force exerted on the line is transferred to said sensing means and thus to said body; electronic means positioned within said body and adapted to receive the force exerted on said sensing means, and transform that force into an indication that a pull is being exerted on the fishing line; and at least part of said sensing means being collapsible to a position adjacent said body such that said sensing means are out of contact with the fishing line during casting.

2. A sensing device as claimed in claim 1 wherein at least part of said sensing means is pivotally mounted to said body.

3. A sensing device as claimed in claim 1 wherein said sensing device includes weighing means.

4. A sensing device as claimed in claim 3 wherein the article to be weighed is placed on said weighing means and wherein the force exerted thereon is transferred to said electronic means within said body, which electronic means thereafter measures that force to give an indication of the weight of the article on said weighing means.

5. A sensing device as claimed in claim 1 wherein said sensing means and weighing means are integral.

6. A sensing device as claimed in claim 5 wherein a single electronic means is provided to indicate pull on the line and measure the weight of an article on said weighing means.

7. A sensing device as claimed in claim 5 wherein the pull on the line and the weight on the weighing means both exert a force which pivotally displaces said integral sensing means/weighing means.

8. A sensing device as claimed in claim 7 wherein said electronic means measures the amount of angular displacement to ascertain the extent of force being exerted.

9. A sensing device as claimed in claim 1 wherein said body of the sensing device is provided with a control keyboard and a display panel to control the device and provide information on said display.

10. A sensing device as claimed in claim 1 wherein said indication that a pull is being exerted on the fishing line is a visual indication.

11. A sensing device as claimed in claim 1 wherein said indication that a pull is being exerted on the fishing line is an audio indication.

12. A sensing device as claimed in claim 1 wherein said sensing means includes a pivotable sensing arm against which the fishing line acts.

13. A sensing device as claimed in claim 12 wherein said sensing arm is provided with a free wheeling roller against which the fishing line acts.

14. A sensing device as claimed in claim 1 wherein said sensing means includes at least two fixed arms against which the fishing line is supported and positioned.

15. A sensing device as claimed in claim 14 wherein said fixed arms are each provided with a free wheeling roller against which the fishing line acts.

16. A sensing device as claimed in claim 1 wherein said sensing means include projecting arms having open ends whereby the fishing line may selectively contact either the upper or lower surface of the sensing means.

17. A sensing device for use with a fishing rod and line comprising a body; support means connected to said body and adapted to secure the sensing device to the fishing rod; sensing means extending from said body which, in use, contact the fishing line of the fishing rod; said sensing means being mounted in such a way that any force exerted on the line is transferred to said sensing means and thus to said body; electronic means positioned within said body and adapted to receive the force exerted on said sensing means, and transform that force into an indication that a pull is being exerted on the fishing line; weighing means carried by said body for weighing the weight of an object independently of the fishing line; and said sensing means and said weighing means are integral.

18. A sensing device as claimed in claim 17 wherein at least part of said sensing means is pivotally mounted on said body.

19. A sensing device as claimed in claim 17 wherein said sensing means and said weighing means are integral and a single electronic means is provided to indicate pull on the line and measure the weight of an article on said weighing means.

20. A sensing device as claimed in claim 17 wherein said sensing means include at least two fixed arms against which the fishing line is supported and positioned; and said fixed arms are each provided with a free wheeling roller against which the fishing line acts.

21. A sensing device for use with a fishing rod and line comprising a body; support means connected to said body and adapted to secure the sensing device to the fishing rod; sensing means extending from said body which, in use, contact the fishing line of the fishing rod; said sensing means being mounted in such a way that any force exerted on the line is transferred to said sensing means and thus to said body; electronic means positioned within said body and adapted to receive the force exerted on said sensing means, and transform that force into an indication that a pull is being exerted on the fishing line; and at least part of said sensing means being collapsible to a position adjacent said body; said sensing means including at least two fixed arms against which the fishing line is supported and positioned; and said fixed arms each provided with a free wheeling roller against which the fishing line acts.

* * * * *